F. E. SMITH AND F. W. CURNAN.

MECHANISM FOR MAKING STAY TIPS.

APPLICATION FILED MAY 1, 1919.

Reissued July 15, 1919.

14,691.

2 SHEETS—SHEET 1.

INVENTORS

Frederick E. Smith

Frank W. Curnan

BY Walter O. Holden

ATTORNEY

THE COLUMBIA PLANOGRAPH CO., WASHINGTON, D. C.

F. E. SMITH AND F. W. CURNAN.

MECHANISM FOR MAKING STAY TIPS.

APPLICATION FILED MAY 1, 1919.

Reissued July 15, 1919.

14,691.

2 SHEETS—SHEET 2.

INVENTORS

Frederick E. Smith

Frank W. Curnan

BY Walter A. Holden

ATTORNEY.

UNITED STATES PATENT OFFICE.

FREDERICK E. SMITH AND FRANK W. CURNAN, OF DERBY, CONNECTICUT, ASSIGNORS TO ROBERT N. BASSETT COMPANY, INCORPORATED, OF SHELTON, CONNECTICUT, A CORPORATION OF CONNECTICUT.

MECHANISM FOR MAKING STAY-TIPS.

14,691. Specification of Reissued Letters Patent. Reissued July 15, 1919.

Original No. 1,284,803, dated November 12, 1918, Serial No. 235,153, filed May 17, 1918. Application for reissue filed May 1, 1919. Serial No. 294,070.

*To all whom it may concern:*

Be it known that we, FREDERICK E. SMITH and FRANK W. CURNAN, citizens of the United States, residing at Derby, county of New Haven, State of Connecticut, have invented an Improvement in Mechanism for Making Stay-Tips, of which the following is a specification.

This invention relates to machines for making metallic tips for corset stays and like articles and its object is to construct an economical, durable and efficient machine which will reduce the cost of production and reduce the scrap to a minimum.

The usual method of making stay tips is to employ a common form of double acting press containing a plurality of double acting punches arranged to operate simultaneously, sometimes as many as six being contained in a single machine. Each double acting punch forms a complete tip out of the sheet metal strip which is fed to the machine. This strip is just wide enough to comprehend the field of all the punches as it passes through the machine, the punches being set in a convenient staggered arrangement and as near each other as possible so as to leave the least amount of scrap between the blanks. This is a common way of making many kinds of articles, especially small articles, out of sheet metal and when the tools are once set the machines are capable of a very high speed and great quantity of production. These machines, however, have the same inherent disadvantages when making stay tips that they have when making other small articles. These disadvantages are well known and relate among other things to the breaking of the tools and the difficulty in keeping them in good working condition. Sometimes the difficulties are so great that the use of a plurality of sets of punches in a single machine is abandoned for the use of a single set so that only one article is made at a time instead of several. In making tips, however, two or three and sometimes six sets of punches are usually employed in a single machine.

The shape of the finished tip is such that the blank out of which it is formed is usually oblong in contour having long straight sides and short round ends, so that, should these blanks be cut out of a sheet metal strip of the same width as themselves the cutting operation would be confined to the round ends of the blanks, the sides already having been cut during the formation of the strip. It is the elimination of these side cutting operations that is one of the characteristics of the present invention.

Other features of the invention will appear in the machine set forth in the following description and accompanying drawings in which like reference characters refer to corresponding parts.

Figure 1:
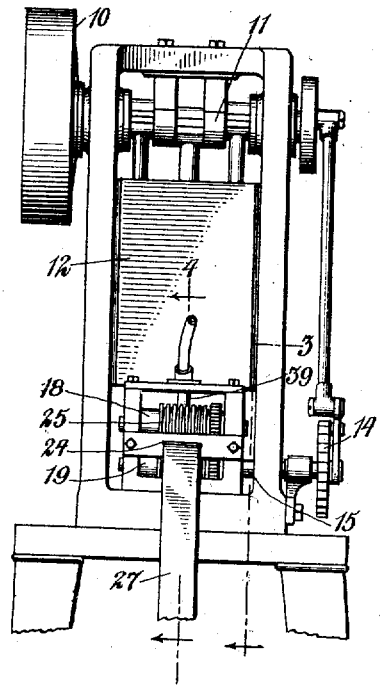
Figure 1 is a rear elevation of a power press, showing our novel mechanism mounted thereon.
Figure 2:
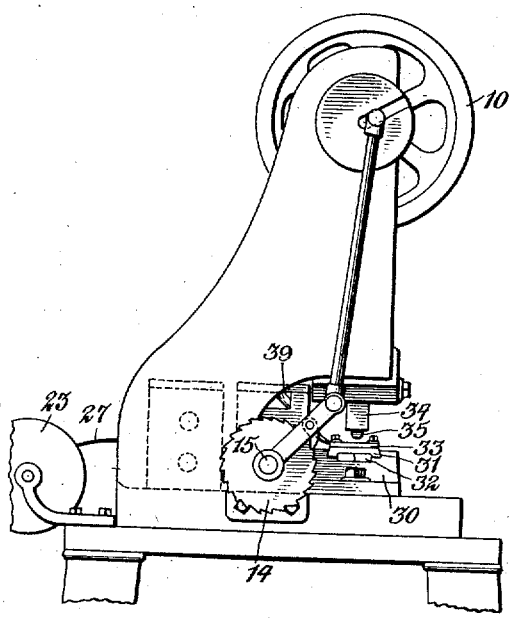
Fig. 2 is a side elevation as seen from the right in Fig. 1.
Figure 3:
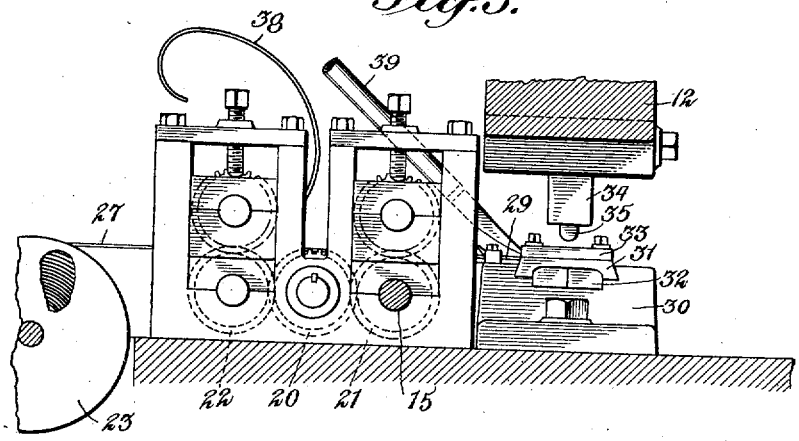
Figure 4:
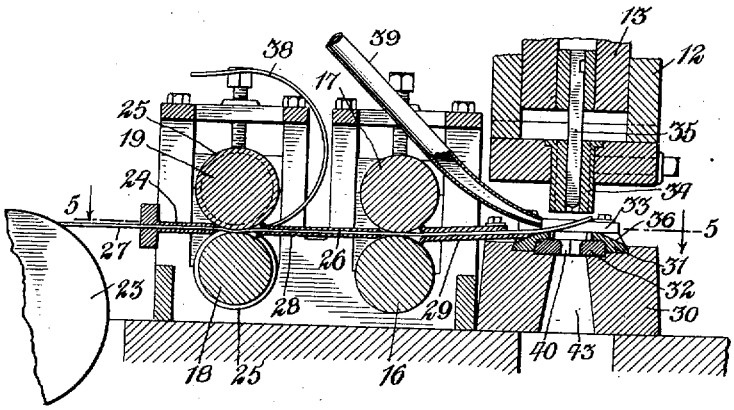
Figure 5:
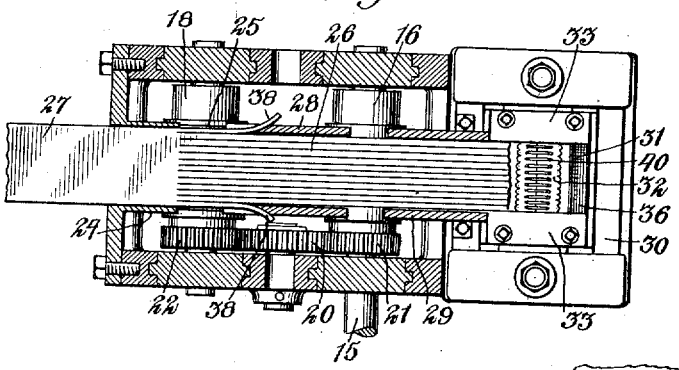
Figure 6:
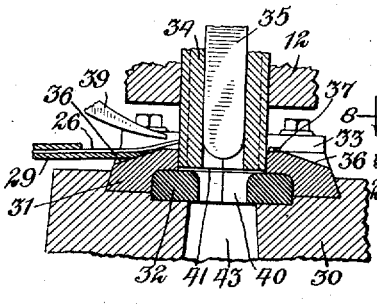
Figure 7:
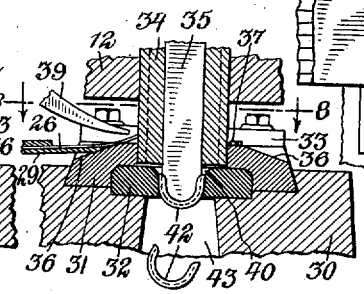
Figure 8:
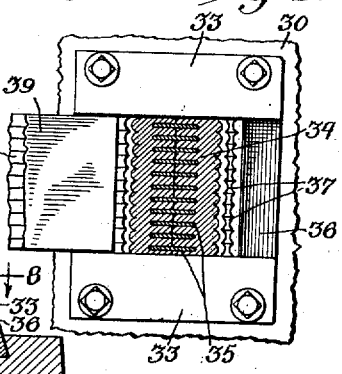

Fig. 3, an elevation on an enlarged scale, partly in section on the line 3—3 in Fig. 1, looking in the direction of the arrows;

Fig. 4, a section on the line 4—4 in Fig. 1, looking in the direction of the arrows;

Fig. 5, a section on the line 5—5 in Fig. 4, looking in the direction of the arrows;

Figs. 6 and 7, sectional views, on a still larger scale, corresponding with Fig. 4 and illustrating successive steps in the operation of the punches, and Fig. 8, a section on the line 8—8 in Fig. 7, looking in the direction of the arrows.

This machine differs from the double acting press, above described, in two essential features. The first is, that the sheet metal is slit when it enters the machine, into strips of a width equal to the width of each tip blank, so that instead of feeding a solid wide strip to the punches it feeds a plurality of narrow strips, that is, one strip for each punch. Secondly, instead of employing a separate blanking punch for each tip it employs a single blanking punch which bridges all of the strips and inside of which all the drawing punches operate.

The press illustrated is an ordinary double acting power press and is not thought to require description in detail, as specifically it forms no part of the present invention. Power is applied by means of a belt, not shown, passing over a fly-wheel 10, on a double throw crank shaft 11. The cranks on this shaft operate an outer slide 12, and an inner slide 13, see Fig. 4, in connection with Fig. 1. A ratchet feed, operated from this shaft and indicated as a whole by 14, drives a shaft 15. 16 and 17 denote the feed rolls and 18 and 19 the slitting rolls. The feed roll and slitting roll shafts carry intermeshing gear wheels, an idler 20 being interposed between the gear wheels 21 and 22 on the lower feed and slitting roll shafts, the ratchet feed and gear wheels co-acting to produce uniform intermittent rotation of the feed and slitting rolls. The strip of metal to be operated upon, indicated by 27, is carried by a drum 23, and passes through a guide 24 to the slitting rolls. The slitting rolls are provided with interlocking angular ribs 25, each rib being just the width of a blank strip 26. The operation of the slitting rolls is therefore to slit strip 27 into blank strips 26 without waste, except the narrow strips necessarily trimmed from the edges of strip 27. The blank strips pass through a guide 28 between the slitting rolls and the feed rolls, and are drawn forward intermittently by the latter. In front of the feed rolls is another guide 29 through which the blank strips pass to the tip forming mechanism.

30 denotes the die block, 31 the upper die, which has but one opening and 32 the lower die, which is shown as made in two parts. The lower die is recessed into and is retained in place by the upper die, and the latter is retained in place by guide blocks 33, bolted to the die block. 34 denotes the blanking punch which is carried by outer slide 12, and 35 the forming punches which are carried by inner slide 13. The blanking punch is shown as made in two parts. It is provided with a series of slots 40 in which the forming punches slide and its front and rear faces consist of series of convex scallops, which cooperate with corresponding concave recesses in the faces of the upper die opening to cut the blank strips into blanks rounded at each end, as required, to produce ordinary commercial stay tips. This portion of the operation will be clearly understood from Fig. 6.

It will be noted that the upper die is beveled, as at 36, on both its rear and forward sides, making it reversible, and that the top of the die lies above the normal path of travel of the blank strips. This is in order to incline the forward ends of the blank strips upward so as to prevent the possibility of their engaging the forward edge of the die opening. As the rear edge of the blanking punch leaves the forward ends of the blank strips with a concave curve, and as both ends of the blanks must be convex curves, it follows that the feeding movement must carry the forward ends of the blank strips slightly beyond the forward edge of the upper die opening. The result is that short pieces of scrap, indicated by 37, are formed in trimming the forward ends of the blanks. These short pieces of scrap and the edge trimmings, indicated by 38, comprise all the scrap made in the entire operation of forming the stay tips from the original strip of metal, there being no waste whatever between the tips transversely, that is, there is no sheet of scrap remaining after the strip has passed through the tip forming mechanism. The edge trimmings 38 do not pass into guide 28 and naturally curl upward out of the way as shown. The short scraps 37 are carried forward and prevented from falling into the die opening, when the punches rise, by puffs of air delivered through a pipe 39, having a widened nozzle.

Fig. 6 shows the position of the parts at the end of the movement of the blanking punch, a blank, indicated by 41, (one of the series) being shown as lying upon the top of the lower die. An instant later the forming punches move downward, as in Fig. 7, and force the blanks through the slots 40 in the lower die. The forming punches and the slots in the lower die are so laid out as to coöperate in forming each blank into a completed stay tip, indicated by 42. These stay tips may be described as U-shaped in elevation and trough-shaped in cross section. The forming punches force the completed articles entirely through the lower die and they drop out through an opening 43 in the die blank. Each actuation of the mechanism therefore produces a number of completed articles corresponding with the number of forming punches in the series.

Among the advantages of this machine may be mentioned the strength and durability of the blanking punch together with the saving of scrap which is formed only at the ends of the blanks instead of entirely around the same as in the old machine. The efficiency of the blanking punch is due to the fact that the entire load ordinarily required for cutting long side edges of the blanks is transferred to the rotary slitters leaving the blanking punch to do only a small fraction of the work heretofore required. Another superior feature of this blanking punch resides in the fact that it is not necessary to subject the same to the enormous strain that the present punches are subjected to when blanking out a plurality of blanks from a solid metal strip.

While the feature of the single blanking punch operating on a plurality of strips of metal is a very important feature of the invention yet it is conceivable that a plurality of blanking punches may be utilized corresponding to the number of strips, provided that the edges of the strips are cut to the shape of the side edges of the blanks so that the blanking punches operate to cut the ends of the blanks only. It is to be understood also that the embodiment of a rotary slitter in the same machine with the blanking and drawing punches for cutting the metal into strips forms one of the features of the invention, yet it is conceivable that the metal may be slit or cut into strips in a different manner and in a separate machine.

Machines provided with revolving cutters for slitting metal longitudinally into strips and feeding them to shearing knives for cutting the strips transversely are old and well known in the art, and for this reason no claim is made that such machines are broadly comprehended within the scope of the invention. It is to be understood, however, that the machine herein illustrated and described is only the preferred embodiment of the invention and is susceptible to such modification as may fairly come within the language of the appended claims.

Having thus described our invention, we claim:

1. Mechanism for making stay tips and similar articles, comprising means for slitting a strip of metal into blank strips, a blanking punch and a blanking die for simultaneously cutting the blank strips into blanks, and a plurality of forming punches and a coöperating die, whereby the blanks are simultaneously formed into completed articles.

2. Mechanism for making stay tips and similar articles, comprising means for slitting a strip of metal into blank strips, a blanking punch and coöperating die for simultaneously cutting the blank strips into blanks and rounding the ends of the blanks, and a plurality of forming punches and a coöperating die, whereby the blanks are simultaneously formed into completed articles.

3. Mechanism for forming stay tips and similar articles comprising intermittently operated slitting rolls and feed rolls, whereby a strip of metal is formed into blank strips and the blank strips are fed forward, a lower die having a plurality of slots, an upper die, a blanking punch coöperating with the upper die by which the blank strips are cut into blanks and the blanks are carried to the lower die, and a plurality of forming punches adapted to pass through the slots in the lower die, whereby the blanks are carried through the slots in the lower die and formed to shape.

4. Mechanism for forming stay tips and similar articles comprising means for slitting a strip of metal into blank strips, a lower die having a plurality of slots, an upper die, a blanking punch coöperating with the upper die, and a plurality of forming punches adapted to pass through the slots in the lower die, whereby blanks are simultaneously cut from the blank strips and then the blanks are simultaneously formed to completed articles.

5. Mechanism for forming stay tips and similar articles comprising means for slitting a strip of metal into blank strips, a lower die having a plurality of slots, an upper die having an opening, the front and rear edges of which consist of concave recesses, a blanking punch having front and rear faces with convex scallops corresponding with the recesses, and a plurality of forming punches adapted to pass through the slots in the lower die, whereby blanks are simultaneously cut from the blank strips, both ends of the blanks are rounded, and then the blanks are simultaneously formed to completed articles.

6. Mechanism for forming stay tips comprising means for slitting a strip of metal into blank strips, a lower die having a plurality of slots, an upper die having an opening, the front and rear edges of which consist of concave recesses, a blanking punch having front and rear faces with convex scallops corresponding with the recesses, and a plurality of forming punches adapted to pass through the slots in the lower die, whereby blanks are simultaneously cut from the blank strips, both ends of the blanks are rounded, and then the blanks are simultaneously formed into stay tips U-shaped in elevation and trough-shaped in cross section.

7. Mechanism for forming stay tips and similar articles comprising rolls provided with interlocking angular ribs, whereby a strip of metal is slitted into blank strips, a blanking punch and die for simultaneously cutting blanks from the blank strips, and forming punches and a coöperating die, whereby the blanks are simultaneously formed into completed articles.

8. Mechanism for forming stay tips and similar articles comprising rolls provided with interlocking angular ribs, for the purpose set forth, a blanking punch and die, whereby blanks are simultaneously cut from the blank strips and the ends of the blanks rounded, and a plurality of forming punches and a corresponding die, whereby the blanks are formed to shape.

9. A machine for making stay tips and like articles comprising means for feeding a plurality of strips of metal, a blanking punch and a blanking die for cutting the strips into blanks, and a plurality of forming punches and coöperating dies whereby the blanks are formed into completed articles.

10. In a machine for making stay tips and like articles means for feeding a plurality of metallic strips, mechanism for cutting said strips into blanks, and drawing punches and coöperating dies for forming the blanks into completed articles.

11. A double acting press having coöperating blanking and forming tools for making stay tips or like articles characterized by the fact that it is provided with means for feeding a plurality of sheet metal strips having their edges cut to the shape of the side edges of the blanks whereby the blanking tools cut the ends of the blanks only.

12. In a double acting press a coöperating blanking punch and die adapted to operate on a plurality of sheet metal strips to form a plurality of blanks in combination with a plurality of drawing punches and coöperating dies for drawing said blanks into completed articles.

In testimony whereof we have hereunto set our hands this 24th day of April, 1919.

FREDERICK E. SMITH.
FRANK W. CURNAN.

Copies of this patent may be obtained for five cents each, by addressing the "Commissioner of Patents, Washington, D. C."